(12) United States Patent
Prokofyev et al.

(10) Patent No.: US 10,019,439 B2
(45) Date of Patent: *Jul. 10, 2018

(54) TEMPORAL TRANSLATION GRAMMAR FOR LANGUAGE TRANSLATION

(71) Applicant: Microsoft Technology Licensing, LLC, Redmond, WA (US)

(72) Inventors: Andrey Prokofyev, Redmond, WA (US); Selvi Chennai, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,095

(22) Filed: Dec. 19, 2016

(65) Prior Publication Data

US 2017/0103064 A1    Apr. 13, 2017

Related U.S. Application Data

(63) Continuation of application No. 14/225,894, filed on Mar. 26, 2014, now Pat. No. 9,535,904.

(51) Int. Cl.
*G06F 17/28* (2006.01)
*G06F 17/27* (2006.01)
(Continued)

(52) U.S. Cl.
CPC ...... *G06F 17/2872* (2013.01); *G06F 17/2264* (2013.01); *G06F 17/274* (2013.01);
(Continued)

(58) Field of Classification Search
None
See application file for complete search history.

(56) References Cited

U.S. PATENT DOCUMENTS 8,060,567 B2 * 11/2011 Carroll ................ G06Q 10/107
709/206
8,131,536 B2 * 3/2012 Weischedel ......... G06F 17/2229
704/2
(Continued)

FOREIGN PATENT DOCUMENTS

EP     1808802     7/2007
EP     2224350     9/2010

OTHER PUBLICATIONS

Ahn, et al., "A Cascaded Machine Learning Approach to Interpreting Temporal Expressions", In Human Language Technologies: The Conference of the North American Chapter of the Association for Computational Linguistics, Apr. 2007, 8 pages.
(Continued)

*Primary Examiner* — Satwant Singh

(57) ABSTRACT

In language translation and intent understanding scenarios, the automated translation of expressions including temporal elements (e.g., calendar dates, date ranges, times, and durations) may be achieved by an implementation of translation techniques, such as compiled rule sets and/or machine learning recognizers that have been trained with a training set. However, sharing development resources among various implementations may be difficult; e.g., updates that extend a rule set for application of the translation techniques to a new context may be difficult to utilize while updating a machine learning recognizer. Presented herein are techniques for facilitating the development of temporal translation resources by providing a temporal translation grammar, comprising recognition rules that specify the recognition of temporal elements; normalization rules that specify the normalization of recognized temporal elements into normalized temporal elements and temporal intent; and translation
(Continued)

rules that translate the normalized temporal elements of an expression into dates in a translated expression.

20 Claims, 7 Drawing Sheets

(51) Int. Cl.
  *G06F 17/22* (2006.01)
  *G06Q 10/10* (2012.01)
  *G06N 99/00* (2010.01)
(52) U.S. Cl.
  CPC ...... *G06F 17/2765* (2013.01); *G06F 17/2775* (2013.01); *G06N 99/005* (2013.01); *G06Q 10/10* (2013.01)

(56) References Cited

U.S. PATENT DOCUMENTS

| | | | |
|---|---|---|---|
| 8,244,821 | B2 | 8/2012 | Carroll et al. |
| 8,346,879 | B2 | 1/2013 | Meunier et al. |
| 8,375,099 | B2 | 2/2013 | Carroll et al. |
| 9,535,904 | B2* | 1/2017 | Prokofyev .......... G06F 17/2872 |
| 2005/0149858 | A1 | 7/2005 | Stern et al. |
| 2006/0248456 | A1* | 11/2006 | Bender ............... G06F 17/2765 715/210 |
| 2007/0244976 | A1 | 10/2007 | Carroll et al. |
| 2008/0154897 | A1 | 6/2008 | Meliha et al. |
| 2008/0215309 | A1 | 9/2008 | Welshedel |
| 2009/0235280 | A1 | 9/2009 | Tannier et al. |
| 2010/0111071 | A1 | 5/2010 | Khare |
| 2010/0158204 | A1 | 6/2010 | Diskin |
| 2010/0318398 | A1 | 12/2010 | Brun et al. |
| 2012/0078611 | A1 | 3/2012 | Soltani et al. |
| 2012/0109637 | A1 | 5/2012 | Merugu et al. |
| 2013/0054644 | A1 | 2/2013 | Nakano |
| 2013/0073662 | A1 | 3/2013 | Meunier et al. |
| 2013/0254677 | A1 | 9/2013 | Carroll et al. |
| 2014/0372102 | A1* | 12/2014 | Hagege ................. G06F 17/278 704/9 |
| 2015/0012807 | A1 | 1/2015 | Vanden Heuvel et al. |
| 2015/0149203 | A1 | 5/2015 | Csurka |
| 2015/0193391 | A1 | 7/2015 | Khvostichenko |
| 2015/0193392 | A1 | 7/2015 | Greenblatt |

OTHER PUBLICATIONS

Hunt, et al., "Speech Recognition Grammar Specification Version 1.0", In W3C Recommendation, Mar. 16, 2004, 69 pages.

Kolomiyets, et al., "KUL: Recognition and Normalization of Temporal Expressions", In Proceedings of the 5th International Workshop on Semantic Evaluation, Jul. 15, 2010, 4 pages.

Kovacevic, et al., "Combining Rules and Machine Learning for Extraction of Temporal Expressions and Events from Clinical Narratives", In Journal of American Medical Informatics, Jan. 2013, 9 pages.

Negri, et al., "Recognition and Normalization of Time Expressions: ITC-irst at TERN 2004", In TERN Evaluation Workshop, Feb. 2, 2005, 9 pages.

PCT 2nd Written Opinion in PCT/UST2015/021624, dated Feb. 12, 2016, 8 pages.

PCT International Search Report in PCT/UST2015/021624, dated Jul. 2, 2015, 11 pages.

Puchol-Blasco, et al., "Multilingual Extension of Temporal Expression Recognition using Parallel Corpora", In 14th International Symposium on Temporal Representation and Reasoning, Jun. 28, 2007, 6 pages.

Saquete, et al., "Multilingual Extension of a Temporal Expression Normalizer using Annotated Corpora", In Proceedings of the International Workshop on Cross-Language Knowledge Induction, Apr. 2006, 8 pages.

Strotgen, et al., "HeidelTime: Tuning English and Developing Spanish Resources for TempEval-3", In Second Joint Conference on Lexical and Computational Semantics, vol. 2—Seventh International Workshop on Semantic Evaluation, Jun. 14, 2013, 5 pages.

Strötgen, et al., "Multilingual and Cross-Domain Temporal Tagging", In Language Resources and Evaluation, vol. 47, Issue 2, Jun. 2013, 5 pages.

U.S. Appl. No. 14/224,894, Amendment and Response filed Dec. 28, 2015, 14 pages.

U.S. Appl. No. 14/224,894, Amendment and Response filed Jul. 25, 2016, 12 pages.

U.S. Appl. No. 14/224,894, Notice of Allowance dated Aug. 31, 2016, 8 pages.

U.S. Appl. No. 14/224,894, Office Action dated Sep. 25, 2015, 15 pages.

U.S. Appl. No. 14/224,894, Office Action dated Mar. 23, 2016, 15 pages.

Wilson, et al., "A Multilingual Approach to Annotating and Extracting Temporal Information", In Proceedings of the Workshop on Temporal and Spatial Information Processing, Jul. 2001, 7 pages.

Zavarella, et al., "FSS-TimEx for TempEval-3: Extracting Temporal Information from Text", In Second Joint Conference on Lexical and Computational Semantics, vol. 2—Seventh International Workshop on Semantic Evaluation, Jun. 14, 2013, 6 pages.

"International Preliminary Report on Patentability Issued in PCT Application No. PCT/US2015/021624", dated Apr. 25, 2016, 9 Pages.

* cited by examiner

102 — EXPRESSION
THE FIRST MOON LANDING OCCURRED | ON JULY 20, 1969. | — 104

102 — EXPRESSION
THE FIRST MOON LANDING OCCURRED | IN 1969. | — 104

102 — EXPRESSION
THE FIRST MOON LANDING OCCURRED | IN '69. | — 104

102 — EXPRESSION
THE FIRST MOON LANDING OCCURRED | IN THE 1960'S. | — 104

102 — EXPRESSION
THE FIRST MOON LANDING OCCURRED | A YEAR BEFORE 1970. | — 104

102 — EXPRESSION
104 — | IN 1969, | THE FIRST MOON LANDING WAS PLANNED AND OCCURRED | IN JULY. | — 104

102 — EXPRESSION
MOON LANDINGS OCCURRED IN | 1969, | | 1971, | AND | 1972. | — 104

102 — EXPRESSION
MOON LANDINGS OCCURRED | BETWEEN '69 AND '72. | — 104

102 — EXPRESSION
MOON LANDINGS OCCURRED | ANNUALLY BETWEEN '69 AND '72. | — 104

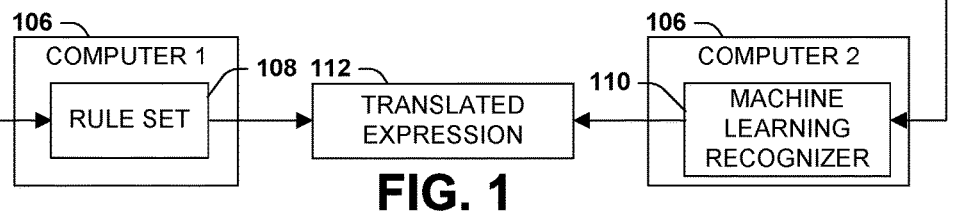

FIG. 1

TEMPORAL TRANSLATION GRAMMAR FOR LANGUAGE TRANSLATION

CROSS-REFERENCE TO RELATED APPLICATIONS

This application is a continuation application and claims priority to U.S. patent application Ser. No. 14/225,894, filed Mar. 26, 2014, entitled "TEMPORAL TRANSLATION GRAMMAR FOR LANGUAGE TRANSLATION," now issued U.S. Pat. No. 9,535,904, which application is incorporated herein by reference in its entirety.

BACKGROUND

Within the field of language translation, many techniques may be utilized to identify, normalize, and/or translate temporal elements of an expression that are associated with a date, such as a calendar date, a weekday, a time of day, or a duration. These techniques often involve the configuration of a device to apply a translation logic to the expression, such as a rule set comprising a set of manually developed rules that respectively specify the translation of a temporal element of an expression into a translated expression, or a machine learning recognizer that has been trained using a training data set to facilitate the translation of temporal elements into translated expressions. Many such techniques may be devised and implemented for a variety of contexts; e.g., a first implementation may comprise a comparatively simple rule set that provides basic date translation for use on a mobile device having comparatively limited computational resources, and a second implementation may comprise a robust machine-learning recognizer and a sophisticated logic that together provide sophisticated, highly accurate date translation for use on computationally plentiful servers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The development and invocation of language translation resources for a variety of contexts as described in the foregoing manner may encounter some development difficulties. For example, when rule sets that are developed manually for a particular context, and machine learning recognizers that are trained using a training data set for a particular context, it may be difficult to extend these language translation resources for other contexts, such as localizing the resources for translation to a new language or dialect. In particular, some techniques may utilize a variety of rule sets and/or machine learning recognizers (e.g., various resources devised for different devices and/or services) or a combination of such techniques, and it may be difficult to share temporal translation resources among the development of such various implementations. That is, while developing a first implementation for a first context (e.g., a rule set for a mobile device) and a second implementation for a second context (e.g., a machine learning recognizer for a computationally robust service), it may be difficult to develop a shared base of information that is utilized by the logic for both implementations. Additionally, in order to extend such resources to new devices, languages, and/or contexts, developers may have to achieve such extensions by working with the specific implementations, e.g., by developing new rules that utilize the same language as the existing rules, and/or by developing a new training data set that enables a machine language recognizer to be extended as desired. However, such implementation-specific development may introduce further complication in the already complicated field of automated temporal language evaluation.

Presented herein are techniques for developing temporal translation resources that are based on a temporal translation grammar, comprising several sets of rules that together provide a translation pipeline for temporal elements in expressions. The temporal translation grammar includes at least one recognition rule that identifies a temporal element of an expression; at least one normalization rule that normalizes a temporal element of the expression into a normalized temporal element; and a translation rule that translates the normalized temporal element into a date, which may be incorporated in a translated expression.

A temporal translation grammar of this type may be devised, e.g., as a human-readable, implementation-independent set of rules, such as an extensible markup language (XML) file that indicates the various sets of rules comprising the temporal translation grammar. Specific implementations of various types may consume the temporal translation grammar in various ways; e.g., a comprehensive language translation rule set may include the temporal translation grammar, and a machine learning recognizer may be trained with both the training set and the temporal translation grammar, and/or may evaluate an expression together with the temporal translation grammar. These variations thus enable implementations based on a variety of techniques to share an implementation-independent temporal translation grammar, thereby facilitating the development of temporal translation resources in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 1 is an illustration of an exemplary scenario featuring a set of devices utilizing various techniques to translate expressions including a variety of temporal elements.

DETAILED DESCRIPTION

Figure 2:
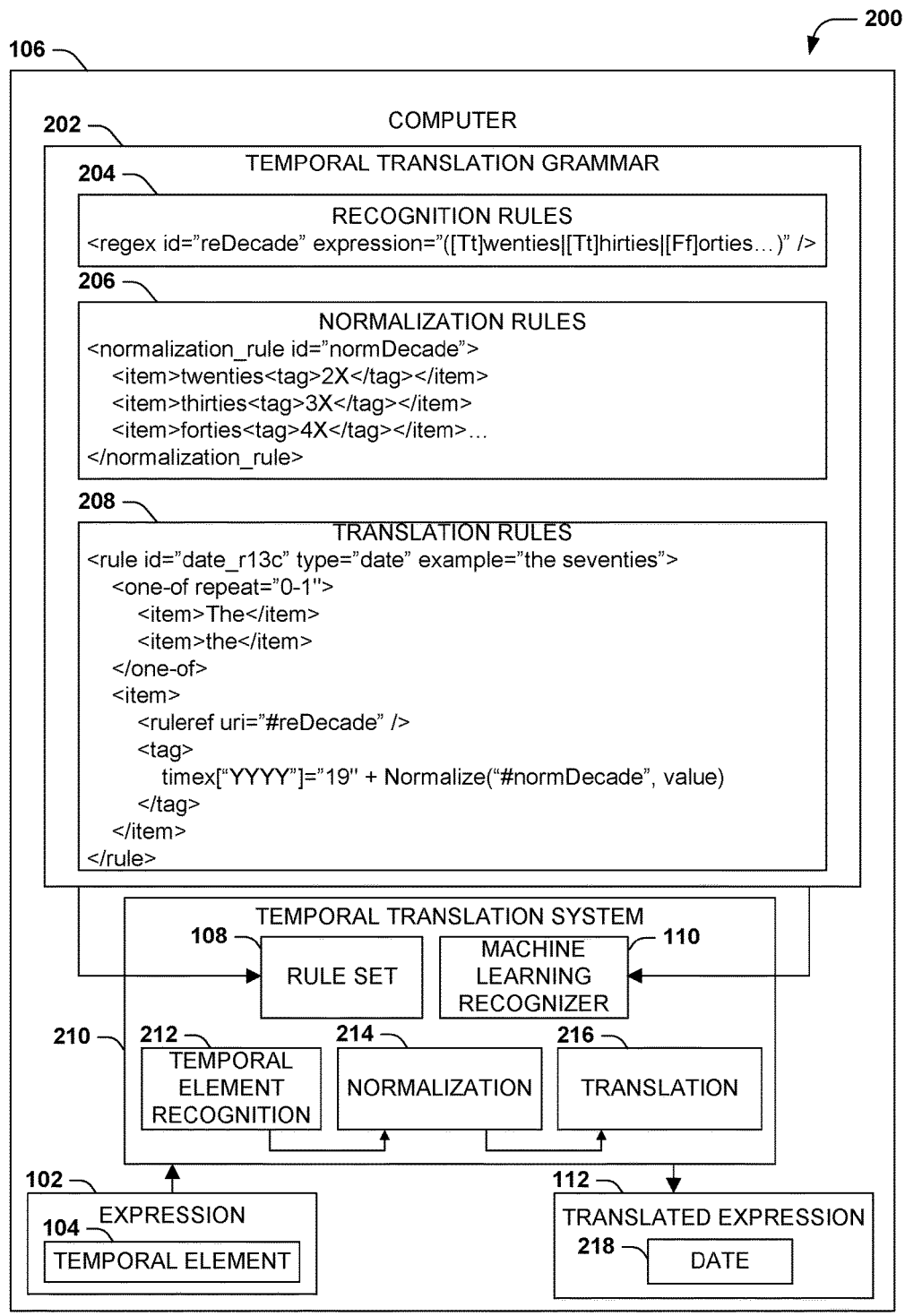
FIG. 2 is an illustration of an exemplary scenario featuring a temporal translation grammar usable to facilitate a computer in translating temporal elements of expressions in accordance with the techniques presented herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an exemplary scenario 100 involving a set of expressions 102 to be translated by a computer 106. In this exemplary scenario 100, in addition to providing a natural-language statement about the historic moon landing program, each of the respective expressions 102 includes a temporal element 104 that is associated with a fact of the expression 102; and although each of the expressions 102 pertains to the dates of the same event, the variety of ways in which the temporal element 104 is expressed in the natural language demonstrates a high degree of variety. For example, a first expression 102 includes a temporal element 104 explicitly specifying a complete calendar date in a standardized format, while a second expression 102 includes a temporal element 104 specifying only the year. A third expression 102 and a fourth expression 102 include temporal elements 104 that identify colloquial ways in which a date may be referenced (e.g., as "'69" or as "the 1960's"). A fifth expression 102 includes a temporal element 104 specified in a relative manner (e.g., one year before another date), and a sixth expression 102 includes a temporal element 104 distributed over two discrete portions of the expression 102 (e.g., "In 1969 . . . in July"). A seventh expression 102 and an eighth expression 102 include temporal elements 104 specifying a collection of dates ("in 1969, 1972, and 1972 . . . " and a date range of "between '69 and '72"). A ninth expression 102 includes a recurring temporal element specifying a range and a frequency ("annually between 1969 and 1972").

In view of the significant language variance in temporal elements 104 that each relate the same date(s) relating to the same basic fact, it may be appreciated that configuring a computer 106 to recognize and interpret the specified dates correctly may be difficult. In order to achieve such recognition, e.g., in order to produce a translated expression 112 that includes the date(s) identified by the various temporal elements 104, a variety of language translation techniques may be implemented. A first computer 106 may include a rule set 108 that has been compiled by a developer to translate the temporal elements 104 of expressions 102 in order to generate the translated expression 112, while a second computer 106 may include a machine learning recognizer 110 (e.g., an artificial neural network, genetically derived algorithm, and/or Bayesian classifier) that has been trained on a training data set to recognize temporal elements 104, and may invoke the machine learning recognizer 110 to identify and translate the temporal elements 104 of the expressions 102. Other computers 106 may include a combination of such techniques, optionally in conjunction with other techniques, in order to translate the expressions 102.

B. Presented Techniques

Among the range of available implementations of temporal translation resources, particular implementations may vary in terms of accuracy, translation speed, ease of maintenance, extensibility to new contexts (e.g., other languages or dialects), and/or the efficient use of computational resources. In some scenarios, these characteristics may represent a tradeoff, and for a suitable translation context (e.g., based on the resources of a particular computer 106), a suitable implementation may be selected as a balance of these tradeoffs. For example, for a computer 106 with comparatively constrained computational resources, such as a mobile phone, a simple rule set 108 may be implemented that is capable of correctly recognizing only the simplest temporal elements 104 (e.g., only the first two expressions 102 in FIG. 1), but may do so in a rapid and resource-efficient manner. Conversely, for a computer 106 with comparatively plentiful computational resources, such as a server, a more robust implementation utilizing a machine learning recognizer 110 may be selected that is capable of accurately recognizing a large body of varying temporal elements 104 (e.g., many of the expressions 102 of FIG. 1), and may fully utilize the computational resources of the server to achieve this result in a rapid manner. In these and other ways, a temporal language translation platform may exhibit various characteristics based on the type and details of the selected implementation.

However, it may be appreciated that as development continues for such implementations (e.g., as the refinement of an implemented temporal translation library of a computer 106, or as the deployment of an implemented temporal translation library across a variety of computers 106 having different characteristics), the ease of further developing such resources, and/or of sharing such extensions among different embodiments, may be significant but difficult to achieve. As a first example, the extension of a resource for a new context (e.g., localization for a new country or language) may depend on the nature of the implementation. For example, a rule set 108 may be extended by compiling an updated set of rules, and a machine learning recognizer 110 may be extended by developing an additional training data set including cases featuring the new features and training the machine learning recognizer 110 on the additional training data set. Achieving such an extension of a resource thus entails a full understanding of the nature of the resource and the manner of providing the extension in accordance with the selected implementation. As a second example, scenarios involving the development of temporal translation resources on a variety of devices may entail different implementations (e.g., a computationally conservative, rule-based temporal translation library on a mobile device, and a computationally expensive, machine-learning-based temporal translation library on a server). However, while developing an extension of this set of resources into a new context, it may be difficult to share an extension among two or more implementations. For example, a rule set 108 may be extended by compiling an updated set of rules, and a machine learning recognizer 110 may be extended by developing an additional training data set including cases featuring the new features and training the machine learning recognizer 110 on the additional training data set, but these development efforts are not intercompatible.

FIG. 2 presents an illustration of an exemplary scenario featuring techniques for developing temporal translation resources in a manner that may facilitate various aspects of such development (e.g., the ease of extending temporal translation resources to new contexts, and the capability of sharing temporal translation resources among disparate implementations). In accordance with these techniques, the exemplary scenario 200 of FIG. 2 provides a temporal translation grammar 202, comprising sets of rules that may be applied to an expression 102 in the manner of a pipeline. The temporal translation grammar 202 includes one or more recognition rules 204 that identifies a temporal element 104 of an expression 102. For example, the recognition rule 204 in the exemplary scenario 200 of FIG. 2 involves a regular expression that is applicable to identify, within an expression 102, a temporal element 104 identifying a decade in the colloquial form "Twenties," "Thirties," etc. The temporal translation grammar 202 also includes one or more normalization rules 206 that, respectively, normalize a temporal element 104 of an expression 102 to a normalized temporal element. For example, the normalization rule 206 in the exemplary scenario 200 of FIG. 2 is applicable to the identified temporal element 104 "Twenties," which may be normalized to the format "2X." The temporal translation grammar 202 also includes one or more translation rules 208 that, respectively, translate a normalized temporal element into a date 218. For example, the translation rule 208 of FIG. 2 provides that any temporal element 104 identified by the "decade" recognition rule 204, after normalization, may be formatted as the standardized form "19" plus the normalized temporal element identified by the corresponding normalization rule 206.

As an example, in the case of the expression 102 "The Twenties," the temporal translation grammar 202 of the exemplary scenario 200 of FIG. 2 is applied in the following manner. First, a temporal element recognition 212 is applied, wherein the recognition rule 204 identifies the phrase "Twenties" as a temporal element 104. Second, a normalization 214 is applied, wherein the normalization rule 206 indicates the translation of the temporal element "Twenties" to the normalized temporal element "2X". Third, a translation 216 is applied, wherein the translation rule 208 specifies that the phrase "The Twenties" is translated as "19" plus the normalized temporal element "2X", resulting in a translated expression 112 with the date 218 "192X," indicating all years between 1920 and 1929. In this manner, the temporal translation grammar 202 in the exemplary scenario 200 of FIG. 2 is applicable to achieve the automated translation of a temporal element 104 of an expression 102 into a date 218 of a translated expression 112 in accordance with the techniques presented herein.

The exemplary scenario 200 of FIG. 2 further illustrates that the temporal translation grammar 202 is usable by a temporal translation system 210 utilizing a variety of implementations and techniques, such as a rule set 108 based on the temporal translation grammar 202, and a machine learning recognizer 110 that utilizes the temporal translation grammar 202 in conjunction with training utilizing a training data set. Because the temporal translation grammar 202 is specified in an implementation-independent manner, these various implementations may utilize the temporal translation grammar 202 as a shared base of temporal translation logic. Accordingly, the contents of the temporal translation grammar 202 are specified in a manner that is comparatively easy for developers to understand, as it is not constrained to the details of a particular implementation. Additionally, disparate implementations may be updated and/or adapted for a new context simply by updating the temporal translation grammar 202. These and other advantages may be achievable through the provision of a temporal translation grammar 202 for use by various temporal translation systems 210 in accordance with the techniques presented herein.

C. Exemplary Embodiments

Figure 3:
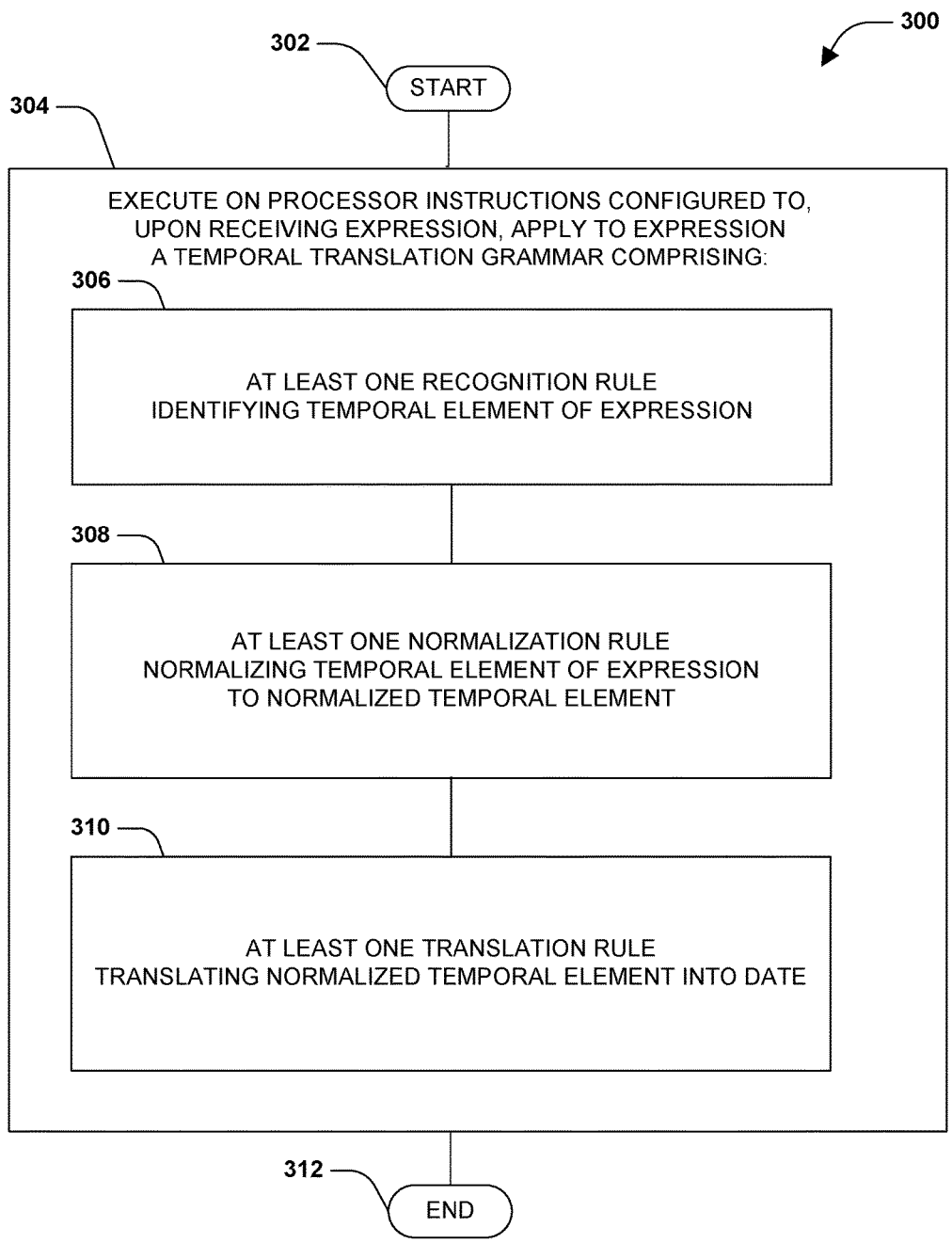
FIG. 3 is a flow diagram of an exemplary method of configuring a device to translate expressions including temporal elements in accordance with the techniques presented herein.

FIG. 3 presents a first exemplary embodiment of the techniques presented herein, illustrated as an exemplary method 300 of configuring a computer 106 to translate expressions 102. The exemplary method 300 may be implemented, e.g., as a set of instructions stored in a memory component, such as a memory circuit, a platter of a hard disk drive, a solid-state storage device, or a magnetic or optical disc, and organized such that, when executed on a processor of the computer 106, cause the computer 106 to operate according to the techniques presented herein. The exemplary method 300 begins at 302 and involves executing 304 the instructions on a processor of the computer 106. Specifically, the instructions are configured to, upon receiving an expression 102, apply to the expression 102 a temporal translation grammar 202 such as provided herein, where the temporal translation grammar 202 comprises at least one recognition rule 306 respectively identifying a temporal element 104 of the expression 102; at least one normalization rule 308 respectively normalizing a temporal element 104 of the expression 102 to a normalized temporal element; and at least one translation rule 310 respectively translating a normalized temporal element of the expression 102 into a date 218. By causing the computer 106 to apply the temporal translation grammar 202 to translate temporal elements 104 of the expression 102 to the dates 218 of a translated expression 112, the exemplary method 300 achieves the translation of the expression 102 in accordance with the techniques presented herein, and so ends at 312.

Figure 4:
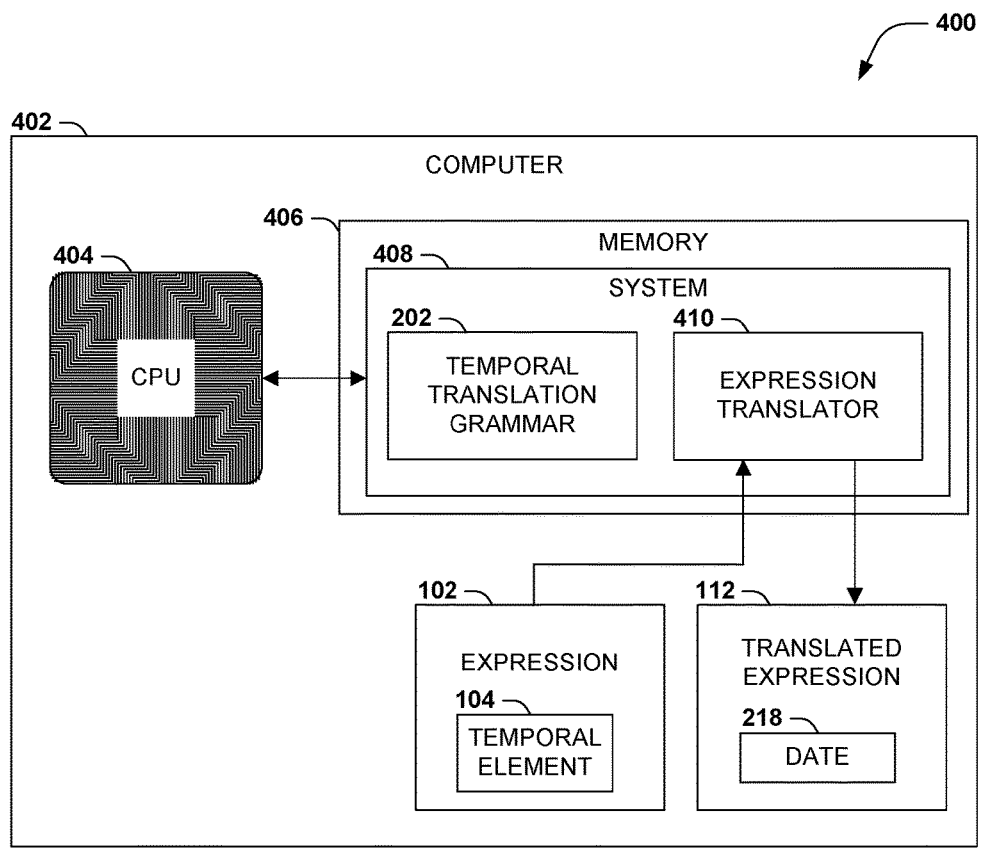
FIG. 4 is a component block diagram of an exemplary system configured to translate expressions including temporal elements in accordance with the techniques presented herein.

FIG. 4 presents a second exemplary embodiment of the techniques presented herein, illustrated as an exemplary scenario 400 featuring an exemplary system 408 configured to cause a computer 402 to translate expressions 102. The exemplary system 408 may be implemented, e.g., as a set of components respectively comprising a set of instructions stored in a memory component of a computer 402 having a processor 404 and a memory 406, where the instructions of respective components are stored in the memory 406 and, when executed on the processor 404, cause the computer 402 to implement a component providing a portion of the techniques presented herein. The exemplary system 408 includes a temporal translation grammar 202 that is stored in the memory 406 and comprises at least one recognition rule 204 respectively identifying a temporal element 104 of an expression 102; at least one normalization rule 206 respectively normalizing a temporal element 104 of the expression 102 to a normalized temporal element; and at least one translation rule 208 respectively translating a normalized temporal element into a date 218. The exemplary system 408 also includes an expression translator 410 that, upon receiving an expression 102, applies the temporal translation grammar 202 to translate the respective temporal elements 104 of the expression 102 into a date 218 of a translated expression 112. In this manner, the exemplary system 408 enables the computer 402 to translate the temporal elements 104 of received expressions 102 through the use of a temporal translation grammar 202 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
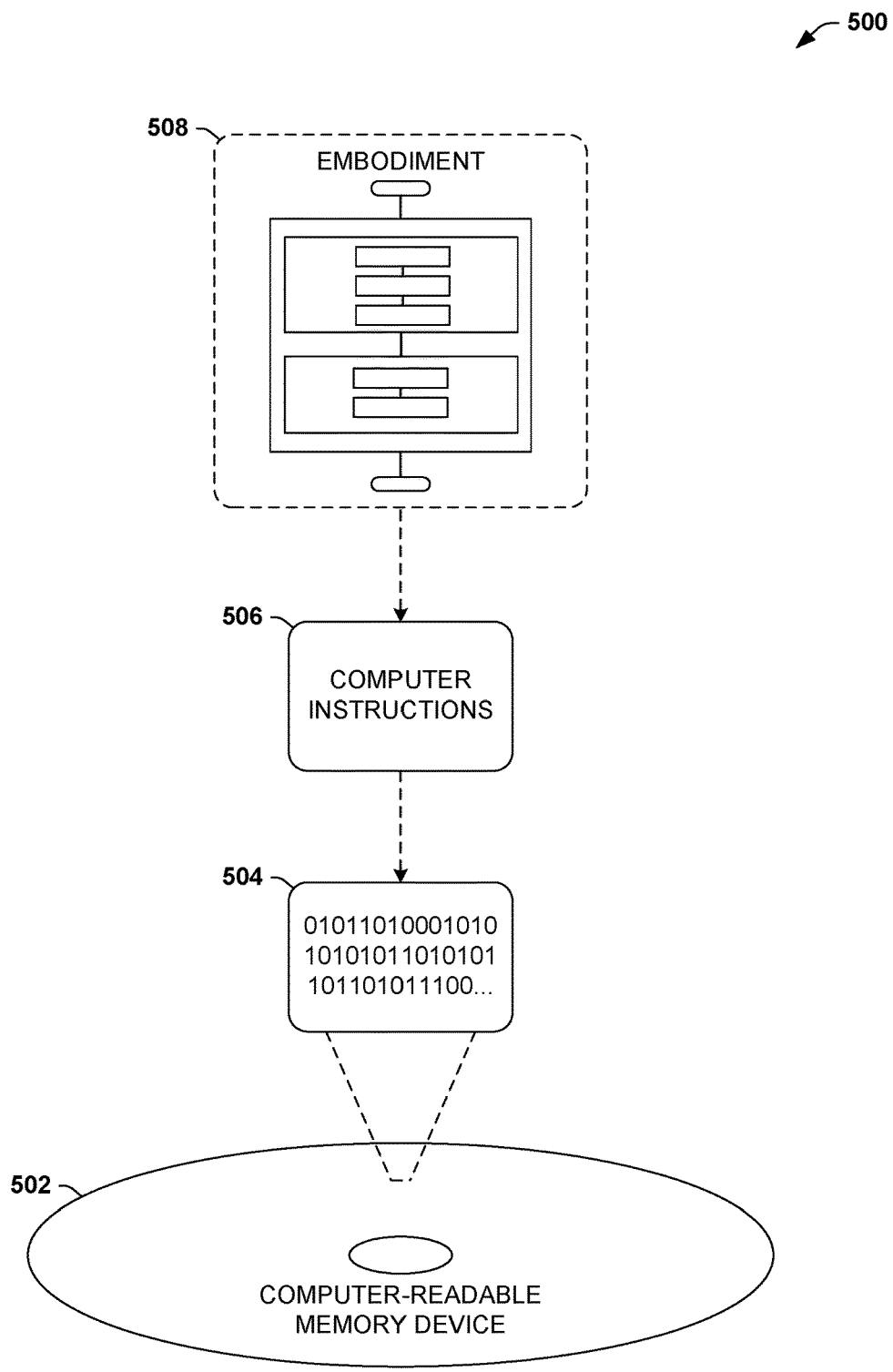
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable storage device 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method of causing a computer 402 to translate expressions 102, such as the exemplary method 300 of FIG. 3. In another such embodiment, the processor-executable instructions 506 may be configured to implement a system configured to cause a computer 402 to translate expressions 102, such as the exemplary system 408 of FIG. 4. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3, and the exemplary system 408 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized to achieve the configuration of a variety of computers 402, such as workstations, servers, laptops, tablets, mobile phones, game consoles, portable gaming devices, portable or non-portable media players, media display devices such as televisions, appliances, home automation devices, and supervisory control and data acquisition (SCADA) devices.

As a second variation of this first aspect, the techniques presented herein may be utilized to translate many types of temporal elements 104, such as calendar dates, times, date collections, date ranges, and durations. Additionally, the techniques presented herein may be utilized to translate such temporal elements 104 while performing translation among many types of languages, including natural languages, such as spoken, written, and gestural languages; formal languages, such as mathematical equations and programming languages; and unstructured text content. In some circumstances, the language of the expression may not be known, and may have to be recognized, or a variety of languages may be utilized, and different translation techniques may be applied to the respective portions of the expression for each language. Such techniques may also be applicable to many types of translation, including the normalization of expressions 102 in a language; the translation of expressions 102 from a first dialect of a language to a second dialect of the same language; the translation of expressions 102 from a first modality of a language to a second modality, such as translating spoken English to written English; the translation of expressions 102 between two languages; the translation of expressions 102 into a standardized format, such as an ISO 8061 date and time format; comparisons of expressions 102 and corresponding translated expressions 112, such as the validation of a translation algorithm; and the training of language processors, such as semantic parsing of expressions 102. These and other scenarios may be suitable for applications of the techniques presented herein.

D2. Implementations

A second aspect that may vary among embodiments of the techniques presented herein involves the implementation of such techniques in devices that perform translation of expressions 102.

As a first variation of this second aspect, the respective rules of the temporal translation grammar 202 may be specified in various ways. As presented in the exemplary scenario 200 of FIG. 2, the respective rules of the temporal translation grammar 202 may comprise, e.g., declarative instructions specified in a human-readable format, such as an extensible markup language (XML) schema. Alternatively, the rules may be specified in a programming language, such as an interpretable script or compilable source code document, or in a machine language, such as a partially or wholly compiled binary. As further illustrated in the exemplary scenario 200 of FIG. 2, the rules may be specified, e.g., as regular expressions (such as the recognition rule 204 that provides a regular expression for matching temporal elements 104 of expressions 102); as declarative instructions (such as the normalization rules 206 associating particular temporal elements 104 of an expression 102 with normalized temporal elements, e.g., "twenties" normalized as "2X"); and/or programming instructions (such as the translation rules 208 providing a programming instruction that is executable to concatenate a string and the output parameter of a normalize function call and assign it to the year value of a timex object).

As a second variation of this second aspect, embodiments of the techniques presented herein involve applying a temporal translation grammar 202 to a provided expression 102, but such application may be implemented in various ways. As a first such example, the temporal translation grammar 202 may be compiled into a rule set 108, such as a partially or wholly compiled binary that instructs a computer 402 to apply the rules of the temporal translation grammar 202 to the expressions 102. For example, a compiled rule set may be provided to identify the temporal elements 104 of expressions 102, and an expression translator 410 may invoke the compiled rule set with an expression 102 to identify the temporal elements 102 of the expression 104 according to the temporal training grammar 202. As a second such example, the temporal translation grammar 202 may be used to inform a machine learning recognizer 110. For example, the temporal translation grammar 202 may be provided with a training set in order to guide the training of the machine learning recognizer 110 to recognize, normalize, and/or translate temporal elements 104 of expressions 102 to dates 218 of translated expressions 112. Alternatively or additionally, the temporal translation grammar 202 may be provided as input to the machine learning recognizer 110 to translate the temporal elements 104 of a particular expression 102 to dates 218; e.g., an expression translator 410 may invoke the machine learning recognizer 110 with the temporal recognition grammar 202 to recognize the temporal elements 104 of the expression 218. A combination of such techniques may be utilized; e.g., the recognition rules 204 may comprise a set of regular expressions, while the normalization rules 206 may comprise a compiled rule set 108, and the translation rules 208 may comprise a machine learning recognizer 110 that is trained to translate normalized temporal elements into dates 218 of a translated expression 112, and that is invoked with the temporal translation grammar 202 to achieve the translation of the temporal elements 104 of a particular expression 102. These and other implementations may be devised to translate the temporal elements 104 of expressions 102 in accordance with the techniques presented herein.

D3. Recognition, Normalization, and Translation

A third aspect that may vary among embodiments of the techniques presented herein relates to the contents of the logic embodied by the temporal translation grammar 202 that achieves the recognition, normalization, and translation of temporal elements 104 of expressions 102.

As a first variation of this third aspect, the rules of the temporal translation grammar 202 may recognize, normalize, and/or translate various combinations of temporal elements 104, or temporal elements 104 specified in the expression 102 in various ways. The exemplary scenario 100 of FIG. 1 provides a set of such examples to which the rules of the temporal translation grammar 202 may be oriented. Additionally, an embodiment may recognize only a portion of an expression 102, and may leave the remainder of the expression untranslated, e.g., where the remainder does not include temporal elements; where the temporal elements are ambiguous and difficult to translate into a specific translated temporal element; or where the temporal element is equivalent to the translated temporal element.

As a first example of this first variation of this third aspect, an expression 102 may comprise a first temporal element and a second temporal element (e.g., "moon landings occurred in '69 and in the early 1970's"), and the rules of the temporal translation grammar 202 may apply to the expression 102 a first normalization rule 206 to normalize the first temporal element 104 of the expression 102 to a first normalized temporal element (e.g., normalizing "'69" as identifying the year 1969), and a second normalization rule 206 that is different from the first normalization rule 206, and that normalizes the second temporal element 104 of the expression 102 to a second normalized temporal element (e.g., normalizing "the early 1970's" to the period of 1970-1975).

As a second example of this first variation of this third aspect, at least one selected normalized temporal element may be associated with at least two dates 218, such as a collection of years or a date range specified from a start date to an end date (e.g., the range "1971-1972," or "Monday-Wednesday"), and at least one selected translation rule 208 of the temporal translation grammar 202 may translate the selected normalized temporal element into at least two dates 218 (e.g., the year 1971 and the year 1972, or calendar dates corresponding to the Monday, Tuesday and Wednesday weekdays of a particular week). As another example, at least one selected normalized temporal element may be associated with a portion of a date range, such as one or more seasons that occur annually during a year, and the translation may result in translated temporal elements that specify typical dates within each year for the specified seasons.

Figure 6:
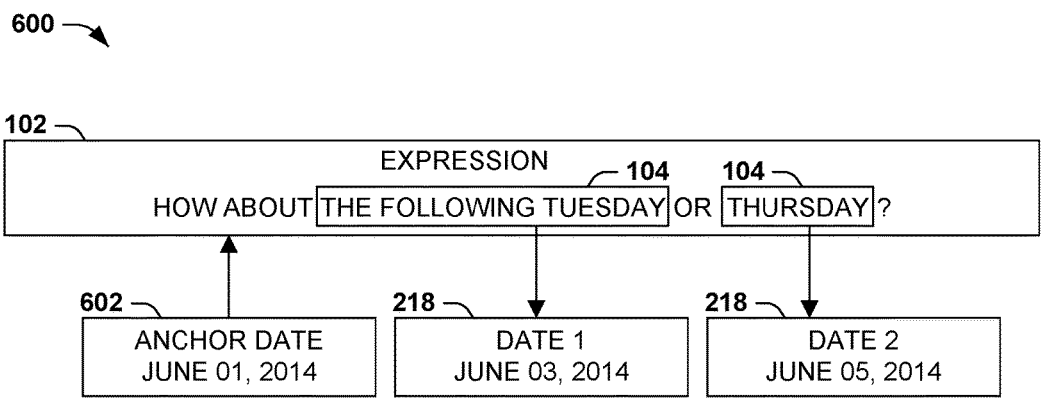
FIG. 6 is an illustration of an exemplary scenario featuring a translation of temporal elements of an expression in view of an anchor date related thereto in accordance with the techniques presented herein.

FIG. 6 presents an illustration of an exemplary scenario 600 featuring a third example of this first variation of this third aspect, wherein the temporal elements 104 of an expression 102 are specified relative to an anchor date 602. For example, an expression 102 may explicitly or implicitly refer to a previously specified date 218, and may include temporal elements 104 that are relative that date 218, such as "How about the following Tuesday?" A temporal translation grammar 202 may include rules that are capable of identifying the anchor date 602 explicitly or implicitly referenced by or associated with the expression 102, and of offsetting the temporal elements 104 by the anchor date 602 (e.g., identifying the range of calendar dates within the week referenced by the anchor date 602, and identifying the calendar date of the Tuesday of that week in accordance with the temporal element 104 of the expression 102).

As a second variation of this third aspect, a computer 402 embodying the techniques presented herein may have access to a knowledge store comprising at least one fact, and the temporal translation grammar 202 may include rules that utilize the knowledge store to translate the normalized temporal elements of an expression 102 into a date 218 using the facts of the knowledge store. For example, a user of the computer 402 may also provide a user profile, such as a social profile with a social network, and the expressions 102 of the user may invoke facts associated with the facts of the user profile, such as the user's birthday. The temporal translation grammar 202 may include rules that enable the use of such facts in the identification of such temporal expressions (e.g., a recognition rule 204 providing a regular expression such as "_'s birthday" to identify this portion of the expression 102 as a temporal element 104; a normalization rule 206 providing a normalization of such a temporal element 104, such as specifying the location within the user profile of the specified individual where his or her birthday may be found; and/or a translation rule 208 providing a translation of the normalized temporal element 104). Such contextual knowledge may also be utilized, e.g., to determine an anchor date 602 relative to which the temporal elements 104 of the expression 102 are specified. For example, an expression 102 such as "the Monday after John's birthday" may be evaluated by the temporal translation grammar 202 by first recognizing "the Monday after" as a temporal element 104 and "John's birthday" as an anchor date; by accessing the knowledge store to determine the date of John's birthday; and by applying a normalization rule and/or translation rule to determine the calendar date of the Monday following the birthdate of the individual named John. Many such variations in the logic exhibited in the recognition, normalization, and/or translation of the temporal elements 104 of the expressions 102 may be included in temporal translation grammars 202 in accordance with the techniques presented herein.

D4. Additional Features

A fourth aspect that may vary among embodiments of the techniques presented herein involves additional features that may be included in some embodiments.

As a first variation of this fourth aspect, some embodiments may include a grammar extender that adds to the temporal translation grammar 202 at least one rule provided by an application of the computer 402. For example, one or more applications 402 may provide one or more supplemental recognition rules 204, normalization rules 206, and/or translation rules 208 that may extend the temporal translation grammar 202 for a new domain; e.g., a cultural holidays database may provide such rules to enable the recognition, normalization, and translation of temporal elements 104 associated with the holidays of a particular culture.

As a second variation of this fourth aspect, one or more rules may include instructions that are to be applied to the expression 102 and/or normalized temporal elements in particular conditions. For example, a normalization rule 206 may comprise a normalization condition that is associated with a temporal element 104 of the expression 102, and at least one normalization instruction to be performed when the normalization condition is satisfied (e.g., the normalization rule 206 may specify that, upon identifying a temporal element 104 specified as "next leap year," the computer 402 is to execute instructions that determine the next leap year following the current year, and to select the calendar year as the normalized temporal element for this temporal element 104). The translation may also identify parts of speech of the expression 102, and may identify the temporal elements 104 of the expression 102 through part-of-speech evaluation (e.g., in view of a typical characterization of dates and times as nouns, such as "Saturday is a holiday," or adjectives, such as "The Saturday appointment is canceled"). Such instructions may be specified, e.g., as compiled code to be invoked upon the expression 102 to achieve the specified normalization. The computer 402 may, accordingly, be configured to, upon determining that a temporal element 104 of the expression 102 satisfies the normalization condition of the selected normalization rule 206, apply the normalization instructions of the selected normalization rule 206 to the expression 102.

As a third variation of this fourth aspect, in addition to applying the temporal translation grammar 202 to the expression 102, an embodiment may further substitute the respective temporal elements 104 of the expression 102 with the dates 218 achieved by such application; e.g., in addition to determining the dates 218 referenced by the temporal elements 102, the computer 402 may insert the determined dates 218 into a translated expression 112. In an embodiment, this insertion is achieved with the date 218 formatted according to a standardized date format, such as the timex format.

Figure 7:
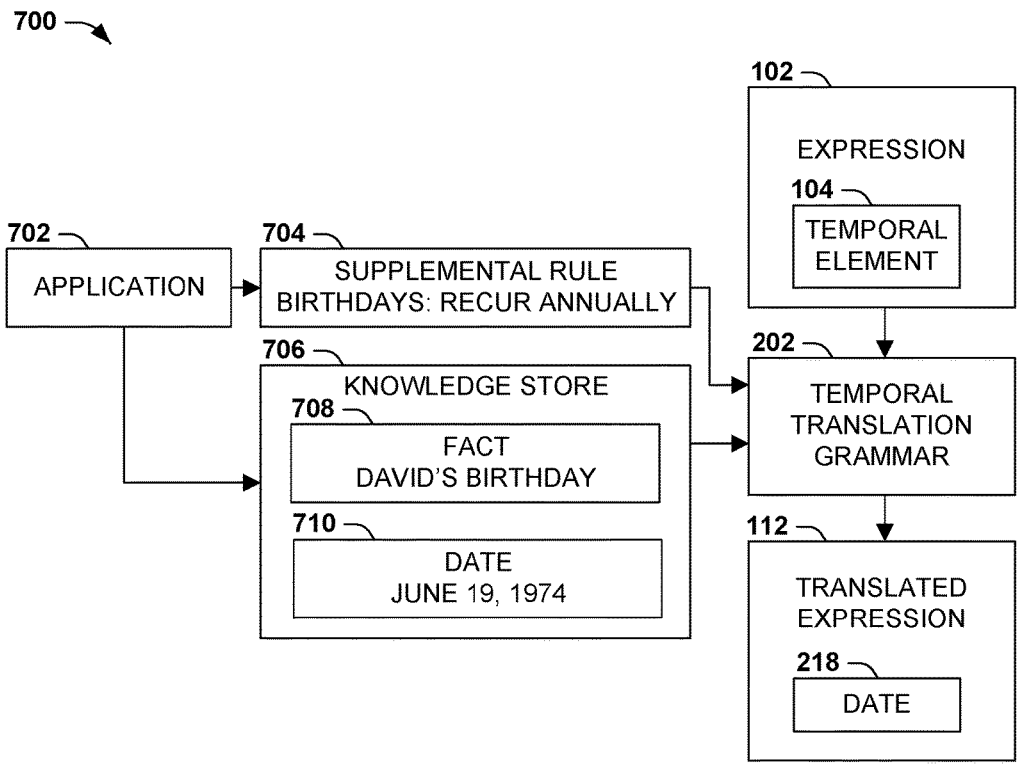
FIG. 7 is an illustration of an exemplary scenario featuring the translation of an expression including a temporal element using a temporal translation grammar supplemented by a supplemental rule and a context provided by an application in accordance with the techniques presented herein.

FIG. 7 presents an illustration of an exemplary scenario 700 featuring a combination of the techniques presented herein. In this exemplary scenario 700, an application 702 provides a supplemental rule 704 to be added to the temporal translation grammar 202 (e.g., a rule for recognizing, normalizing, and translating temporal elements 104 relating to birthdays), as well as a knowledge store 706 for informing this process, such as a fact 708 (e.g., the identity of a particular user) and a date 710 associated with the fact 708 (e.g., the calendar date of the user's birthday). The temporal translation grammar 202 may be applied to translate the temporal elements 104 of an expression 102 using the supplemental rule 704 as well as the knowledge store 706 providing the fact 708 and the associated date 710 to achieve translated expressions 112 including the dates 218 referenced by the temporal elements 104 of the expression 102. In this manner, the temporal translation grammar 202 may utilize the resources of the application 702 to achieve the translation of the temporal elements 104 of the expression 102 in accordance with the techniques presented herein.

E. Computing Environment

Figure 8:
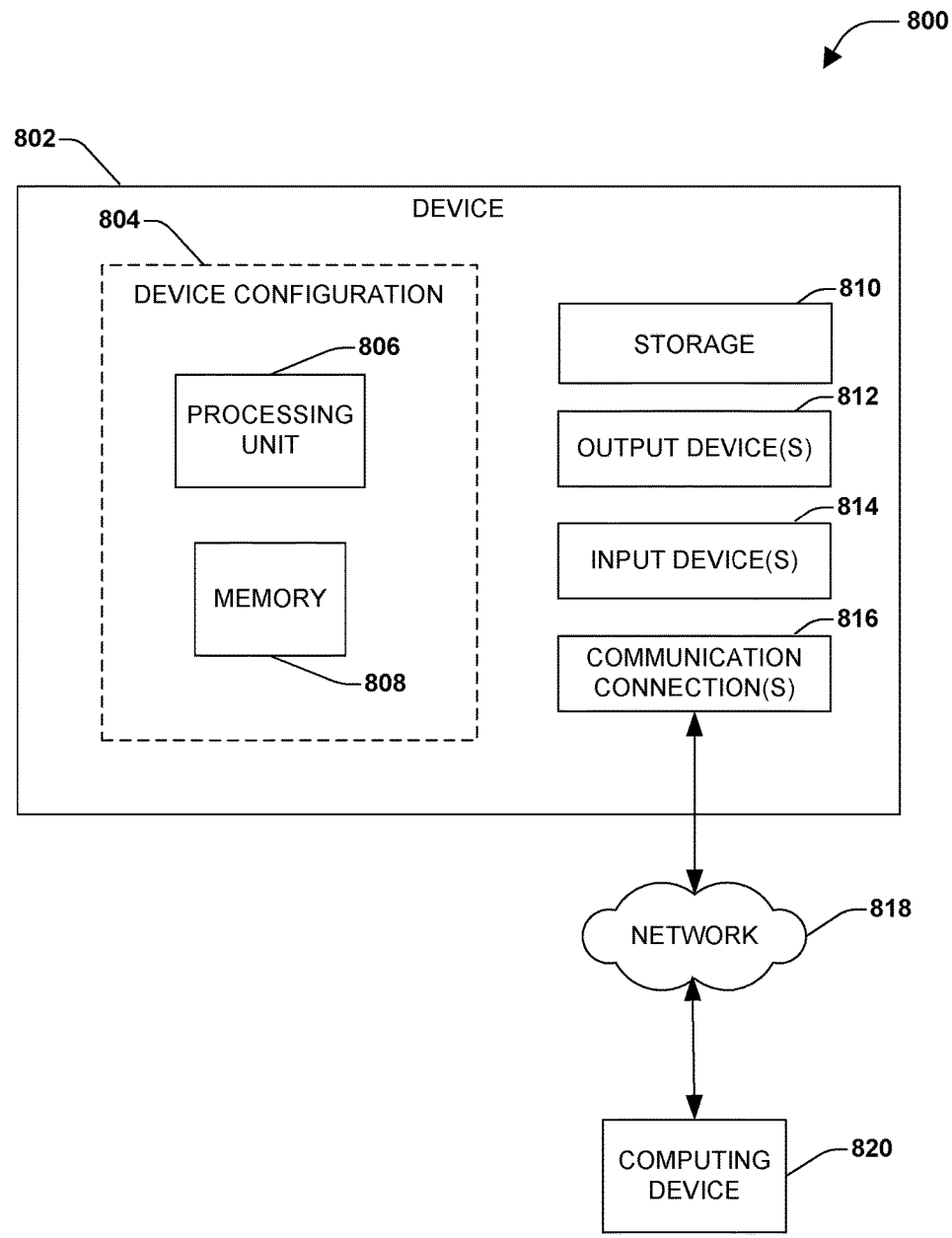
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer-readable storage devices. Such computer-readable storage devices may be volatile and/or non-volatile, removable and/or non-removable, and may involve various types of physical devices storing computer readable instructions or other data. Memory 808 and storage 810 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an"

as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system comprising:
   at least one processor; and
   a memory coupled to the at least one processor, the memory for storing instructions which, when executed by the one or more processors, performs a method for translating an expression, the method comprising:
      applying a temporal translation grammar to a first expression, wherein the temporal translation grammar is operable for use in a first translation context and a different second translation context;
      identifying a first temporal element of the first expression using a set of recognition rules;
      using the first temporal element to identify a second temporal element, wherein the second temporal element is specified relative to the first temporal element;
      normalizing the second temporal element using a set of normalization rules; and
      translating the normalized temporal element into a first date using a set of translation rules.

2. The system of claim 1, wherein the temporal translation grammar comprises one or more sets of rules applied to the first expression in a pipeline manner.

3. The system of claim 1, wherein the one or more sets of rules comprises at least one of a set of regular expressions, a compiled rule set and a machine learning recognizer.

4. The system of claim 1, wherein the first expression comprises the first temporal element and the second temporal element.

5. The system of claim 1, the method further comprising:
   receiving a second expression, the second expression comprising the second temporal element; and
   applying the temporal translation grammar to the second expression.

6. The system of claim 1, wherein using the first temporal element to identify the second temporal element comprises:
   identifying the first temporal element is implicitly referenced;
   normalizing the first temporal element using the set of normalization rules; and
   translating the normalized first temporal element into a second date using the set of translation rules.

7. The system of claim 1, wherein the set of recognition rules is associated with a pattern matching utility operable to identify one or more temporal elements in received expressions.

8. The system of claim 1, wherein the temporal translation grammar is implementation-independent such that the temporal translation grammar is operable for use as a shared base of temporal translation logic.

9. The system of claim 8, wherein the temporal translation grammar is operable to be used by a first computing device including a compiled rule set and a second computing device including a machine learning recognizer.

10. The system of claim 1, wherein temporal translation grammar is operable to translate temporal elements between two or more languages selected from the group consisting of spoken language, written language, gestural language, mathematical equations, programming languages and unstructured text.

11. A method of translating an expression using a computer, the method comprising:
   applying the expression to a temporal translation grammar, wherein the temporal translation grammar is operable for use in a first translation context and a different second translation context;
   identifying a first temporal element of the expression using at least one recognition rule;
   using the first temporal element to identify a second temporal element, wherein the second temporal element is specified relative to the first temporal element;
   normalizing the second temporal element using at least one normalization rule; and
   translating the normalized temporal element into a date using at least one translation rule.

12. The method of claim 11, wherein the one or more sets of rules comprises at least one of a set of regular expressions, a compiled rule set and a machine learning recognizer.

13. The method of claim 11, wherein the second temporal element specifies at least one of a date range and a collection of dates.

14. The method of claim 11, wherein a grammar extender adds to the temporal translation grammar at least one rule provided by an application of the computer.

15. The method of claim 11, wherein the temporal translation grammar is operable to be used by a first computing device including a compiled rule set and a second computing device including a machine learning recognizer.

16. A system comprising:
   at least one processor; and
   a memory coupled to the at least one processor, the memory for storing instructions which, when executed by the one or more processors, performs a method for translating an expression using a computer, the method comprising:
      applying the expression to a temporal translation grammar, wherein the temporal translation grammar is operable for use in a first translation context and a different second translation context;
      accessing a knowledge store to identify a set of facts associated with a user of the system;
      determining one or more rules for the set of facts;

based on the one or more rules, identifying a first temporal element of the expression;

normalizing the first temporal element using at least one normalization rule; and translating the normalized temporal element into a date using at least one translation rule.

17. The system of claim 16, wherein the knowledge store comprises information associated with one or more profiles associated with the user, and wherein the expression invokes one or more facts associated with the information.

18. The system of claim 17, wherein the temporal translation grammar provides for determining a location within the one or more profiles of at least one fact in the set of facts.

19. The system of claim 16, the method further comprising identifying a second temporal element of the expression, where in the first temporal element is an anchor date and the second temporal element is a date relative to the anchor date.

20. The system of claim 16, the method further comprising:

receiving one or more supplemental rules for processing one or more expressions; and adding the one or more supplemental rules to the temporal translation grammar.

* * * * *